United States Patent [19]

Ureshino

[11] Patent Number: 5,522,716
[45] Date of Patent: Jun. 4, 1996

[54] BLADDER CARRYING AND SETTING APPARATUS FOR TIRE VULCANIZING PRESS

[75] Inventor: Kashiro Ureshino, Takasago, Japan

[73] Assignee: Kabushiki Kaisha Kobe Seiko Sho, Kobe, Japan

[21] Appl. No.: 223,530

[22] Filed: Apr. 5, 1994

[30] Foreign Application Priority Data

Apr. 5, 1993 [JP] Japan ................................. 5-103605

[51] Int. Cl.⁶ ...................................... B29C 35/02
[52] U.S. Cl. ........................................ 425/48; 425/58
[58] Field of Search .................... 425/43, 48, 52, 425/58

[56] References Cited

U.S. PATENT DOCUMENTS

| | | | |
|---|---|---|---|
| 2,559,119 | 7/1951 | Frank | 425/48 |
| 4,846,649 | 7/1989 | Hasegawa et al. | 425/58 |
| 4,872,822 | 10/1989 | Pizzorno | 425/48 |
| 5,393,480 | 2/1995 | Pizzorno | 425/48 |
| 5,409,361 | 4/1995 | Ichikawa et al. | 425/48 |

FOREIGN PATENT DOCUMENTS 4139861  6/1992  Germany .................. 425/48

Primary Examiner—James P. Mackey
Attorney, Agent, or Firm—Oblon, Spivak, McClelland, Maier & Neustadt

[57] ABSTRACT

A bladder carrying and setting apparatus for tire vulcanizing press capable of automatically setting a bladder to a center mechanism of the tire vulcanizing press, wherein the setting apparatus is for setting a bladder assembly supported by a top ring and a bottom ring at the top and bottom of the bladder to the center mechanism, and comprises a closable chuck between the top end of a vertically movable center post of the center mechanism and the top ring, the chuck being operated by the vertical movement of a rod installed at center of the center post, and the rod being vertically moved by a hydraulic cylinder (a driving means) disposed on the bottom end of the center post; and in addition a releasable locking device between a hub located on the outer periphery of the center post of the center mechanism and the bottom ring.

6 Claims, 9 Drawing Sheets

FIG. I

BLADDER CARRYING AND SETTING APPARATUS FOR TIRE VULCANIZING PRESS

BACKGROUND OF THE INVENTION

1. Field of the Invention

The present invention relates to a bladder setting apparatus capable of automatically setting a bladder to, and removing it from, the center mechanism of a tire vulcanizing press, and to a carrying apparatus for automatically carrying the bladder to, and from, the center mechanism.

2. Description of the Related Art

First the tire vulcanizing press will be explained with reference to FIG. 8. The tire vulcanizing press has a lower mold 102 fixedly mounted on a lower mold mounting member 101, an upper mold 104 which is fixedly mounted on an upper mold mounting member 103 and can open and close towards the lower mold 102, a pressure cylinder 106 which applies a pressure to a pressure transmission rod 105 vertically provided on the upper mold mounting member 103, and a center mechanism 107 vertically movably disposed at the center of the lower mold mounting member 101. Either of the lower mold 102 and the upper mold 104 has a built-in heating means, and the center mechanism 107 has an inflatable bladder 111 for pressure and heat application under the supply of a heat pressure medium in contact with the inner surface of a green tire.

In the above-described tire vulcanizing press, the bladder 111 repeats expansion and deformation operations under a high-heat, high-pressure environment every curing cycle and therefore requires replacement with a new part at intervals of about 5 to 8 days. Also in the event of a flat tire or a tire having such a damage as a hole, the bladder 111 requires replacement at the time of mold change. As shown in FIG. 9 showing a conventional apparatus, the bladder 118 held at the top and bottom by a top ring 116 and a bottom ring 117 is replaced in one set by the use of a carrying apparatus comprising such a lifting equipment 115 as a fork lift truck. That is, a new bladder 118 laid outside of the press is lifted by the lifting equipment 115, and moved to a position just above the center mechanism 107, where the new bladder 118 is lowered. Subsequently, the bottom ring 117 is turned by hand to be screwed on the upper portion 120a of a hub 120 of the center mechanism 107 and then the top ring 116 is secured through a bracket 122 to the top end 121a of a center post 121 of the center mechanism 107, thereby setting the new bladder 118 to the center mechanism 107. An old bladder 118 is removed by reversing the above procedure.

The conventional setting apparatus, however, has such a problem that since the bladder 118 is manually installed to the center mechanism 107, technical man power and time are required. Also, the installation of the bottom ring to the hub 120, being done near the lower mold which is hot, is hazardous to the engineer, and therefore the adoption of an automatic locking device has been proposed. At present, however, the installation of the top ring 116 to the center post 121 is still performed manually. The carrying apparatus comprising the lifting equipment 115 such as a fork lift truck also has the problem that since the bladder 118 is brought by the fork lift truck to a position right above the center mechanism 107 and is then lowered, the centering of the bladder 118 can not easily be done. It, therefore, takes much time and labor for carrying and setting the bladder 118, and moreover a technical skill is required.

SUMMARY OF THE INVENTION

The present invention has been accomplished in an attempt to solve the aforesaid problems inherent to the prior art and has as its object the provision of a bladder setting apparatus which can be automatically mounted to the center mechanism. It is another object of the present invention to provide a carrying apparatus which can carry the bladder easily and quickly to the center mechanism.

The setting apparatus of the present invention for accomplishing the aforesaid objects is a setting apparatus for setting, to the center mechanism, the bladder which is held at the top and bottom of the bladder by the top ring and the bottom ring; there is provided a chuck which can be opened and closed, between the top end of a vertically movable center post of the center mechanism. The chuck is operated by the vertical movement of a rod through the center of the center post. The rod is operated up and down by a driving device provided on the bottom end of the center post. In addition, a releasable locking device is disposed on the outer periphery of the center post of the center mechanism and is provided between the vertically movable hub and the bottom ring.

The carrying apparatus of the present invention is a carrying apparatus for carrying, to the center mechanism, the bladder held at the top and bottom thereof by the top ring and the bottom ring, and comprises an upper clamp which can open and close in relation to the top ring, a lower clamp which can open and close in relation to the bottom ring, an arm provided with the upper and lower clamps, and an arm operating means which can move the arm towards, and away from, the center mechanism and vertically on the center shaft of the center mechanism.

According to the aforementioned carrying apparatus, the bladder is held by the upper and lower clamps while maintaining its vertical setting posture, is moved by the arm operating means until the bladder in vertical posture is positioned directly above the center mechanism, and then is moved downwardly to fit on a specific part of the center post and hub of the center mechanism, thus being automatically carried in. The bladder is automatically carried out by reversing the above procedure.

According to the above-described setting apparatus, the bladder is automatically mounted by securing, with the chuck at the top end of the center post, the top ring on the bladder that has been fitted on the specific portion of the center mechanism, and by securing the bottom ring with the locking device of the hub. The bladder can be automatically removed by reversing the procedure. Since there is provided no space at the top end part for mounting the driving device which opens and closes the chuck at the top end of the center post, the driving device is mounted at the bottom end of the center post through a rod passing through the center of the center post.

For better understanding of the present invention as well as other objects and features thereof reference is had to the following drawings and description.

DESCRIPTION OF THE PREFERRED EMBODIMENT

Figure 1:
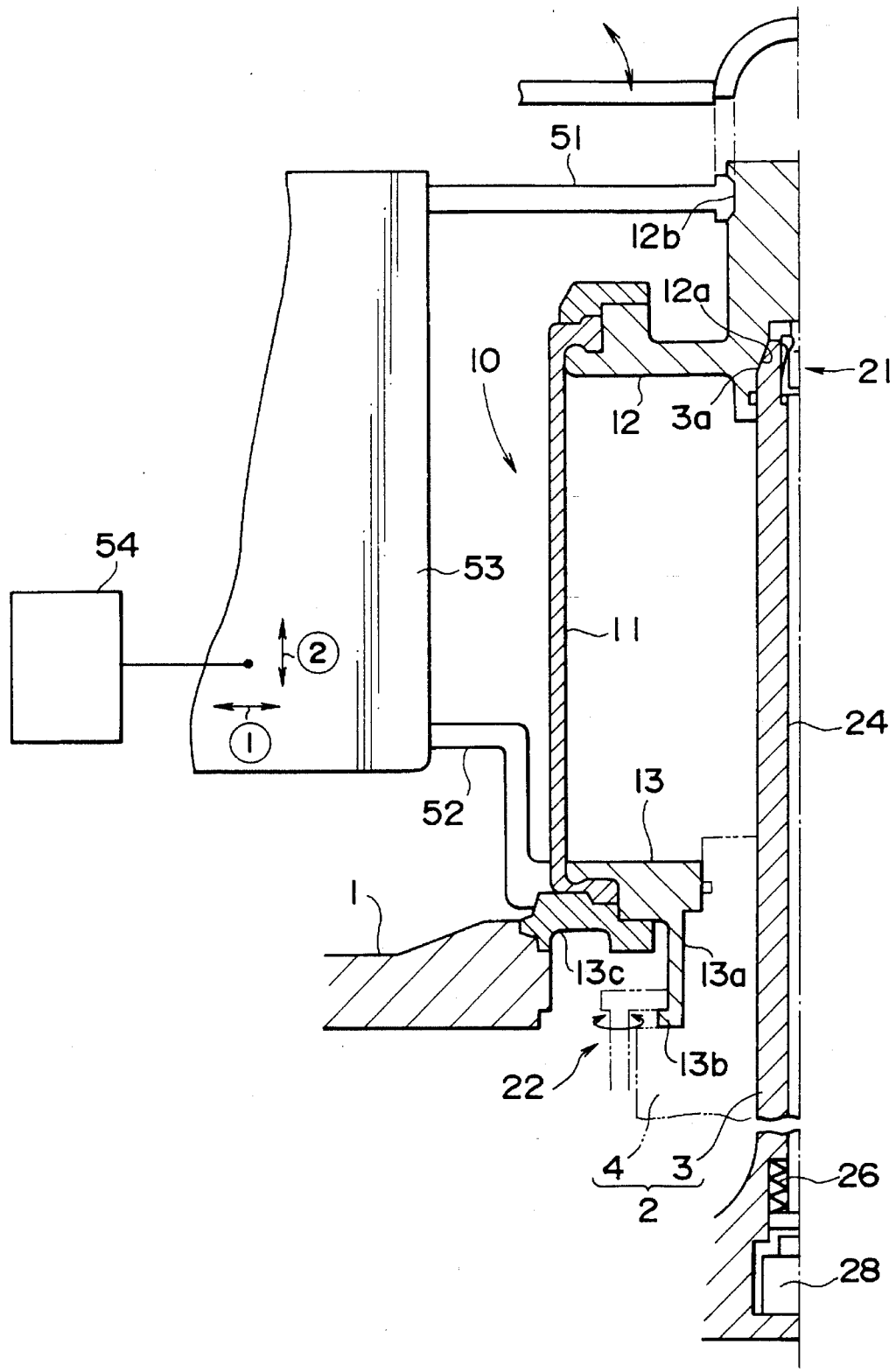
FIG. 1 is a semi-sectional view of a major portion of a carrying apparatus and a setting apparatus of the present invention.

Hereinafter an embodiment of the present invention will be explained with reference to the accompanying drawings. FIG. 1 is a semi-sectional view showing a major portion of a bladder carrying apparatus and setting apparatus for the tire vulcanizing press.

In FIG. 1, a reference numeral 1 denotes a lower mold; 2 refers to a center mechanism positioned at the center of the lower mold 1; 3 is a center post of the center mechanism 2; and 4 refers to a hub of the center mechanism 2.

A bladder 10 is a rubber-bag bladder 11 which is held at the top and bottom by a top ring 12 and a bottom ring 13. A center hole 13a of the bottom ring 13 fits on the hub 4, and is in contact with a step portion of the hub 4 at a flange portion 13b. A bead ring 13c of the bottom ring fits on the lower mold 1. The top ring 12 has a conical hole 12a at center; the bladder 10 is properly positioned with the conical hole 12a engaged with the conical shaft 3a at the top end of the center post 3.

At the top end of the top ring 12 and the center post 3 is mounted a closable chuck 21; between the bottom ring 13 and the hub is provided a releasable locking device 22. The chuck 21 and the locking device 22 constitute the setting apparatus. The bladder 20 is positioned in a specific position of the center mechanism by this setting apparatus.

The carrying apparatus is provided to carry the bladder 10 as far as a position just above the center mechanism 2, bringing the bladder 10 to the setting position illustrated. This carrying apparatus comprises a closable upper clamp 51 for holding a ring groove 12b of the top ring 12, a closable lower clamp 52 for holding a bead ring 13c of the bottom ring 13, an arm 53 protrusively provided with the upper and lower clamps 51 and 52, and an arm operating means 54 which moves the arm 53 towards the center mechanism vertically relative to the center mechanism.

The bladder 11 is held by the upper and lower clamps 51 and 52 outside of the press, and moved to a position right above the center mechanism 2 of the arm operating means 54. Furthermore the bladder 11, when lowered towards the center mechanism 2, is automatically carried to the setting position as shown. At this time, the chuck 21 is open, and the locking device 22 is in an unlock position. Then when the chuck 21 is closed and the locking device 22 is in the lock position, the bladder 11 is automatically mounted to the center mechanism 22. The bladder 11 is automatically removed and carried out by reversing the above-described procedure.

Figure 2:
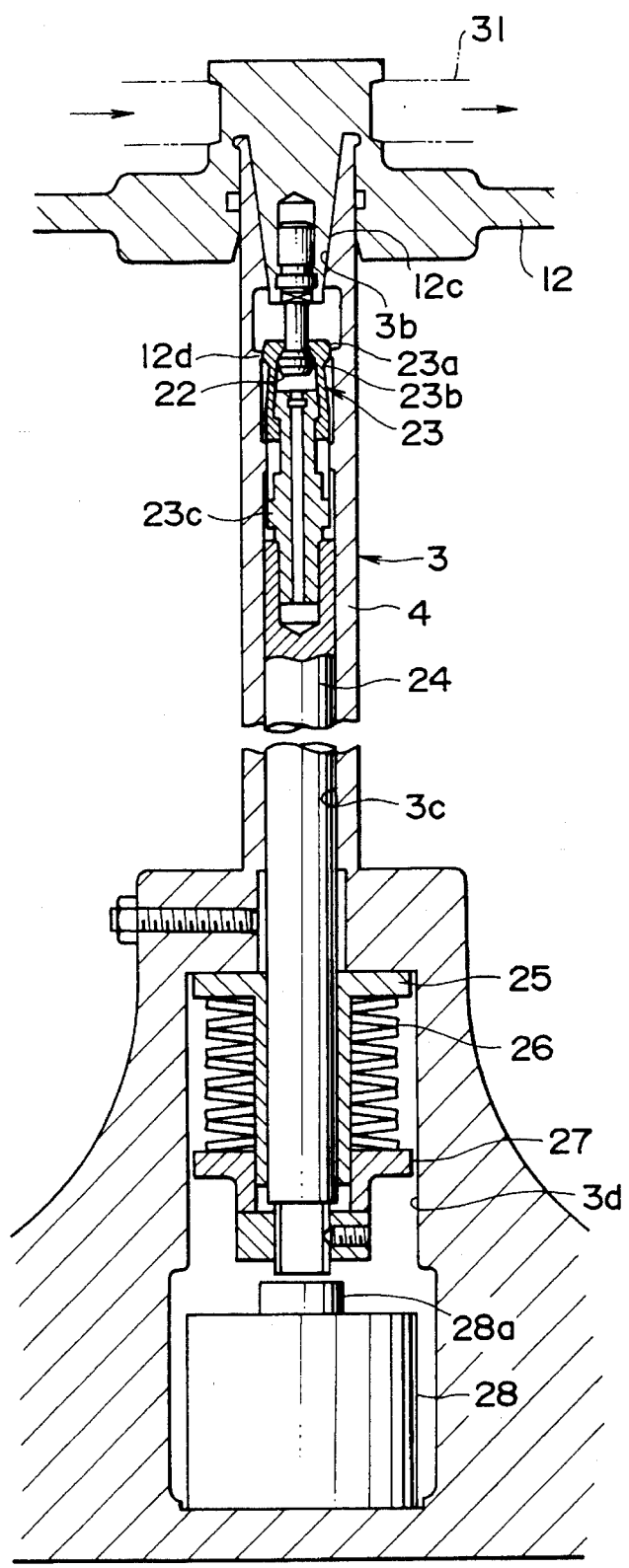
FIG. 2 is a sectional view showing the construction of a chuck of the setting apparatus.
Figure 3:
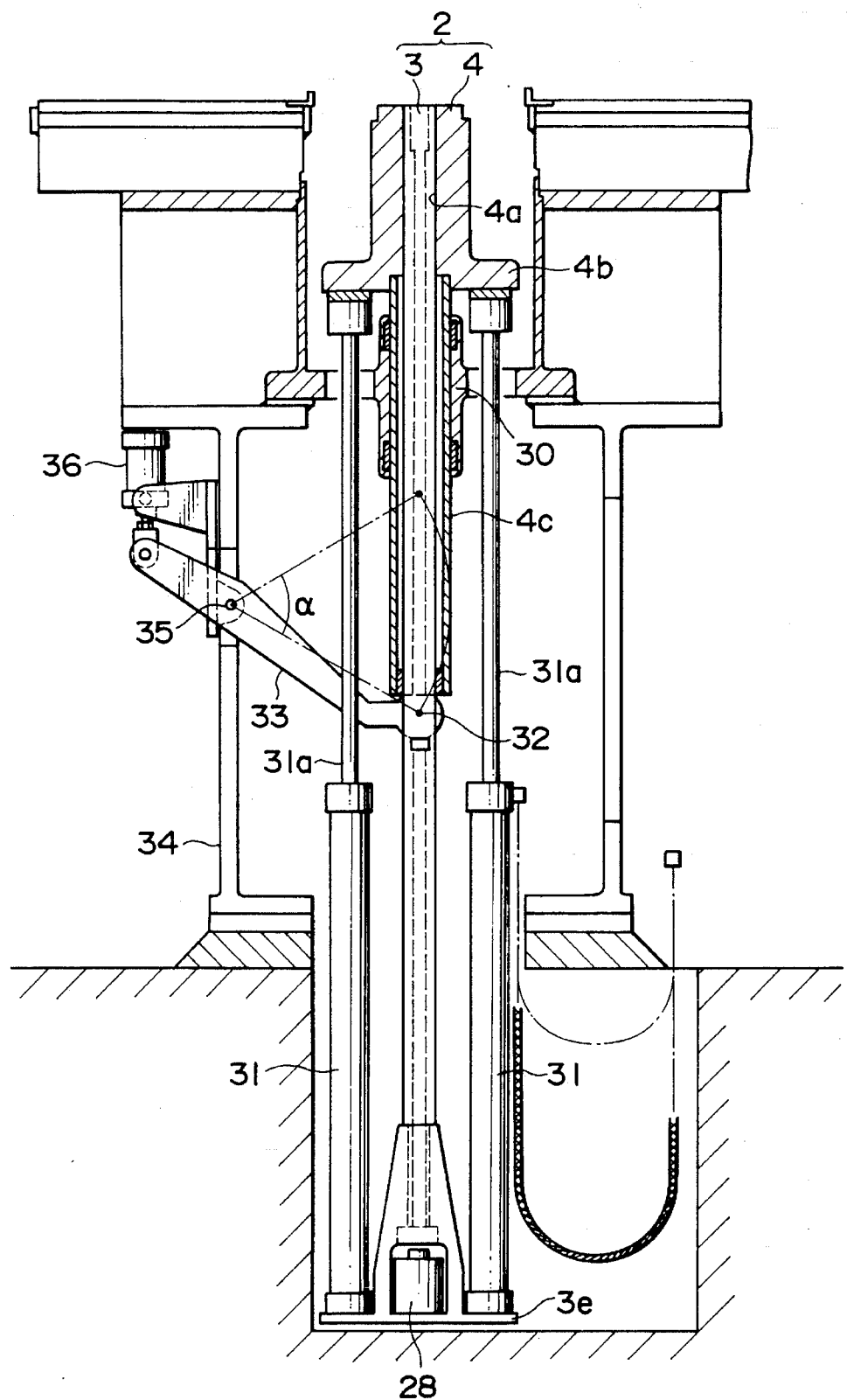
FIG. 3 is a view showing a center mechanism having a built-in chuck.

Next, the chuck 21 will be explained in detail by referring to FIGS. 2 and 3. The top ring 12 is provided with a conical shaft 12c; and a conical hole 3b is provided in the top end of the center post 3. The conical shaft 12c and the conical hole 3b are arranged in vertically reversed positions of FIG. 1. Further below the conical shaft 12c is installed a nose 22 for chucking which is expanded at the forward end. And further below the conical hole 3b is disposed a chuck jaw portion 23, which is composed of a plurality of jaws vertically extending, divided in a circumferential direction, and pushed in the direction in which the chuck jaw portion increases in diameter. With downward withdrawal of the chuck jaws, the large-diameter portion 23 is closed by a projection 12d, thus decreasing in diameter to hug the nose 22 as illustrated. The chuck jaw portion 23, when pushed upwardly, opens until the small-diameter portion 23b no longer contacts the projection 12d, releasing the nose 22. That is, the chuck employed is one type of collet chuck that when the chuck jaw portion 23 is moved upwardly or downwardly, the jaws hugging the nose 22 are opened or closed.

To move the chuck jaw portion 23 upwardly and downwardly, a rod 24 is inserted in a center hole 3c of the center post 3, and the chuck jaw portion 23 and the top end of the rod 24 are connected by a connector 23c. The bottom end of this rod 24 extends into a cavity section 3d in the lower end of the center post 3, being fixed to an end portion 27 through a sleeve 25 and a disc spring 26 in the cavity 3d. A hydraulic cylinder 28 is disposed within the cavity 3d, facing the bottom end of the rod 24. That is, as the rod 28a of the hydraulic cylinder 28 extends it overcomes the force of the disc spring 26, pushing the rod 24 upwardly to open the chuck jaw portion 23. When the rod 28a of the hydraulic cylinder 28 is in a contracted position as illustrated, the rod 24 is moved downwardly with the force of the disc spring 26, thus closing the chuck jaw portion 23 and withdrawing while hugging the nose 22 to hold the chuck positioned by the conical shaft 12a and the conical hole 3b.

As described above, the rod 24 is installed at the center of the center post 3 and the hydraulic cylinder and disc spring as a driving device are located on the bottom end of the center post because the hub 4 is relatively movably positioned on the outer periphery of the center post 3. The center mechanism will be explained by referring to FIG. 3. The hub 4 is of such a form that the lower tubular body 4c extends from a flange 4b, being slidably held on a frame guide 30 by the lower tubular body 4c. The center post 3 is slidably provided within the center hole 4a of the hub 4, and two hydraulic cylinders 31 are provided between a flange 3e on the bottom end of the center post 3 and the flange 4b of the hub 4. With the contraction of the rod 31a of the hydraulic cylinder 31, the forward end of the center post 3 rises out of the hub 4. At about the midway of the center post 4 is laterally protrusively provided a pin 32, with which the forward end of a lever 33 engages. The lever 33 is swingably supported by a pin 35 to a frame 34, being operated through an angle a by a hydraulic cylinder 36. That is, with the swinging motion of the lever 33, the center post 3 and the hub 4 moves downwardly as one body. Consequently, the center post 3 and the hub 4 are held at the level of their own respectively by means of the hydraulic cylinders 31 and 36. It is, therefore, possible to inflate the bladder in a desired position. Since the center post 3 is vertically movable relative to the hub 4, it has become possible to house the hydraulic cylinder 28 as a driving means beneath the bottom end of the center post 3.

Figure 4:
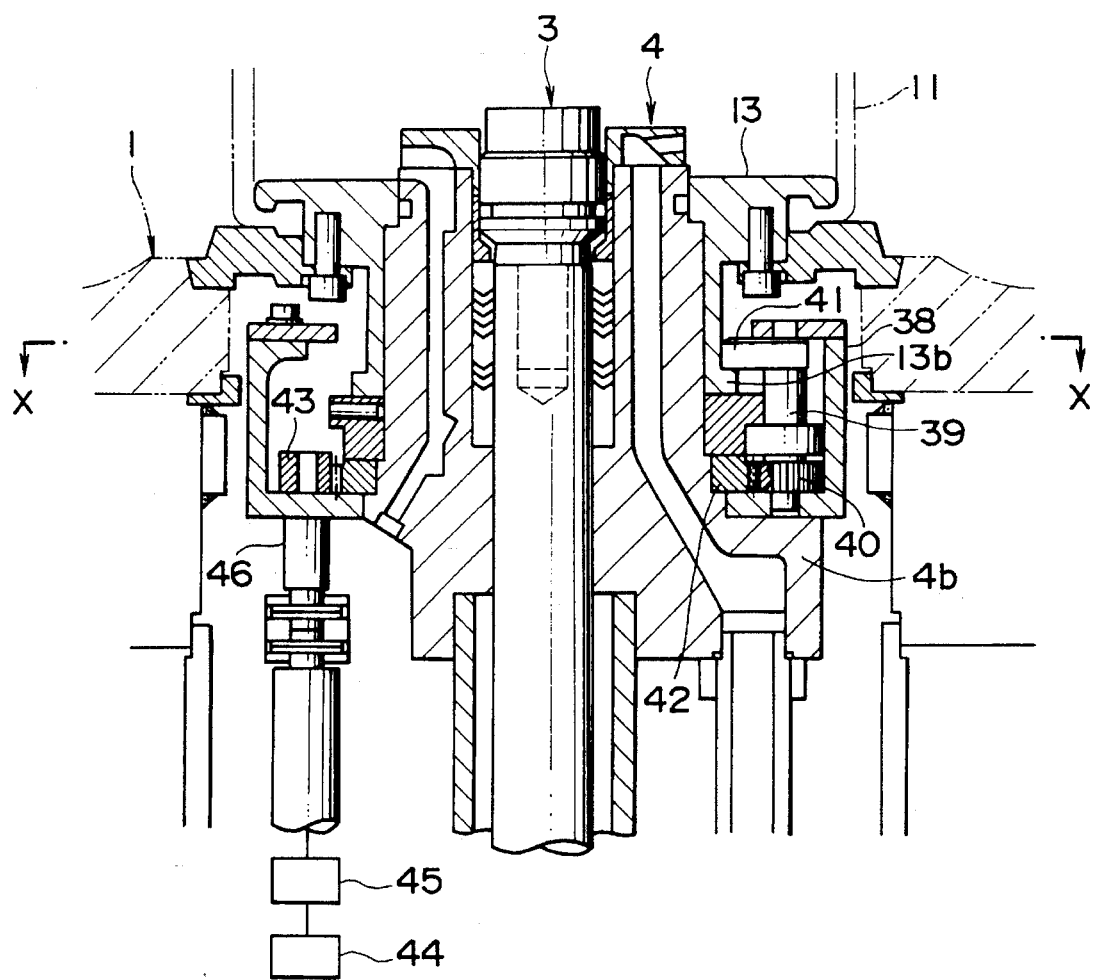
FIG. 4 is a sectional view of a locking device of the setting apparatus.
Figure 5:
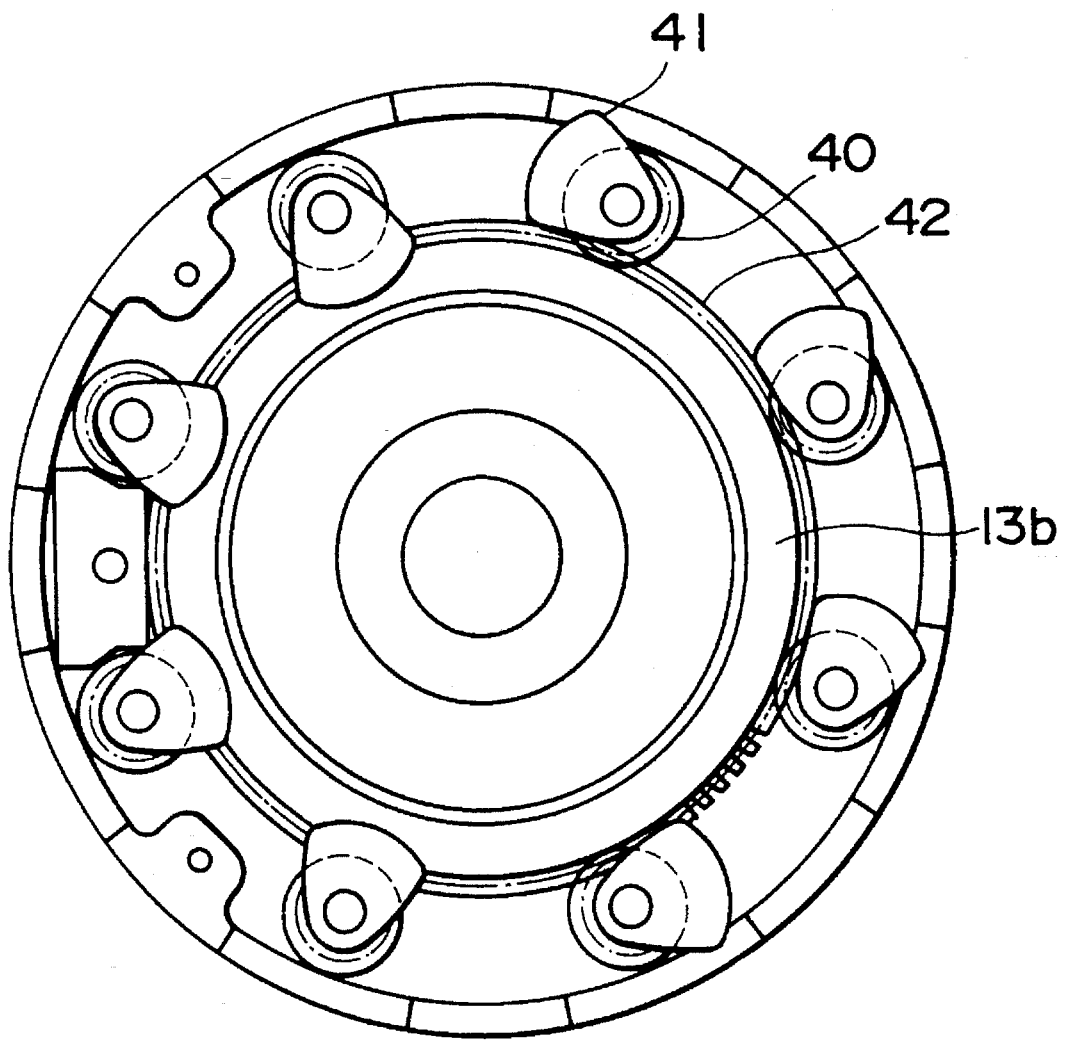
FIG. 5 is a sectional view taken along line X—X of FIG. 4.

Next, the locking device which can be engaged with and disengaged from the bottom ring 13 will be explained by referring to FIG. 4 and FIG. 5. The left half of FIG. 5 shows the bottom ring 13 in a locked state, while the right half of FIG. 5 shows an unlocked state. In FIG. 4, fixed on the flange 4b of the hub is a circular housing body 38 having a section, within which a multitude of vertical shafts 39 are rotatably supported. Below the vertical shafts 39, pinions 40 are fixedly provided, and above the vertical shafts 39 are fixedly provided pawls 41 which is engaged with, and disengaged from, a flange 13b of the top ring. An external gear 42 which commonly meshes with the multitude of pinions 40 is rotatably held on the outer periphery of the hub 4. A driving gear 43 for turning the external gear 42 is secured on the forward end of a shaft 46 connected to a motor 44 and an expansion joint 45. In FIG. 5, the pawls 41 are sectoral parts; as the external gear 42 rotates, the pinions 40 turn simultaneously. Therefore the pawls 41 are able to be set in either of a lock position in which the pawls 41 engage with the flange 13b as shown at left in the drawing, and an unlock position in which the pawls 41 are off the flange 13b as shown at right in the drawing. That is, when the top ring 13 is fitted on the box 4, the pawls 41 are in the unlock position on the right side in the drawing, and therefore will never interfere with the top ring 13.

Figure 6A:
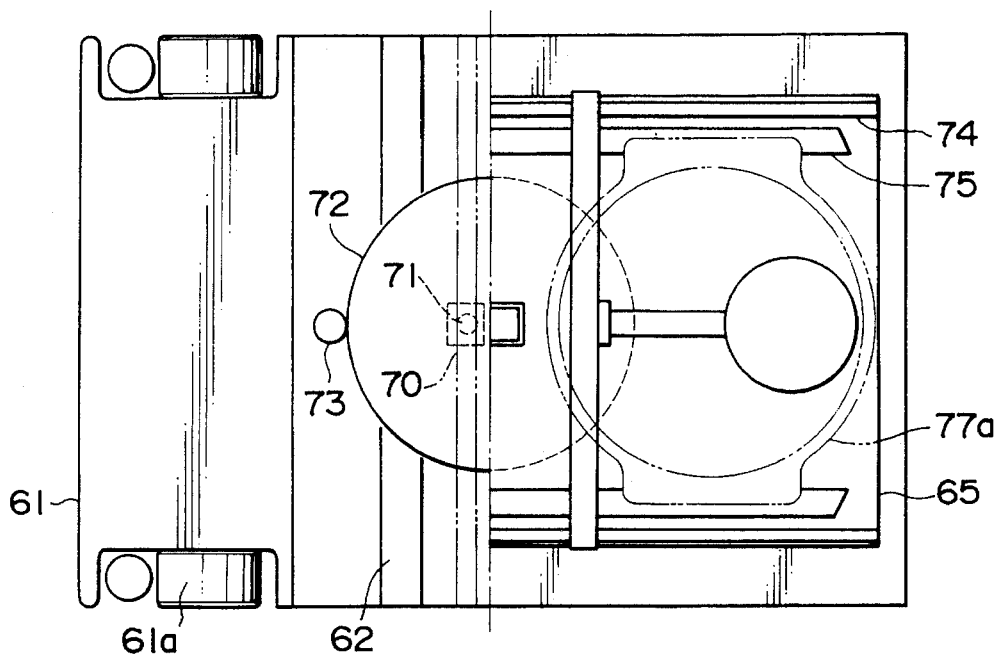
FIG. 6 is a view showing a mold change car equipped with the carrying apparatus.
Figure 6B:
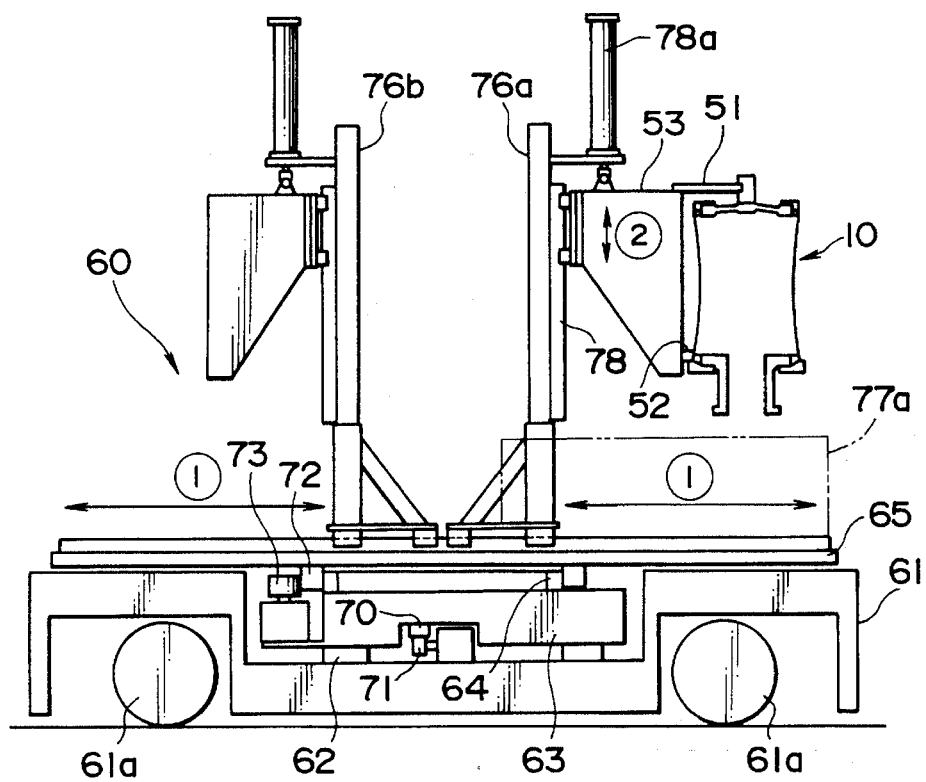

Furthermore, the mold change car having the carrying apparatus will be explained in detail by referring to FIG. 6 and FIG. 7. FIG. 6A is a top view of the mold change car, and FIG. 6B is a side view of the mold change car. The mold change car 60 is of a three-stage construction comprising a travel base 61 mounted with wheels 61a, a slide table 63 which slides along a ring rail 64 located at center of the slide table 63, and a turn table 65 which turns along a ring rail 64 located at center of the slide table 63. The slide table 63 is driven to slide by a rack 70 and a drive pinion 71, and the turn table 65 is driven to turn by the external gear 72 and the drive pinion 73.

On the turn table 65 are laid an outer rail 74 and an inner rail 75; along the outer rail 74, two stand framers 76a and 76b reciprocate in the direction of the arrow ① and a mold assembly 77a travels along the inner rail 75. The turn table 65 has two positions for holding new and old mold assemblies and new and old bladders. The positions are changed over by turning the turn table 65. The arm 53 is slidable along the rail 78 of the stand frames 76a and 76b, and is lifted in the direction ② by the cylinder 78a. At the forward end of the arm 53 are protrusively provided the upper and lower clamps 51 and 52, whereby the bladder 11 is clamped in the vertical setting position.

Figure 7:
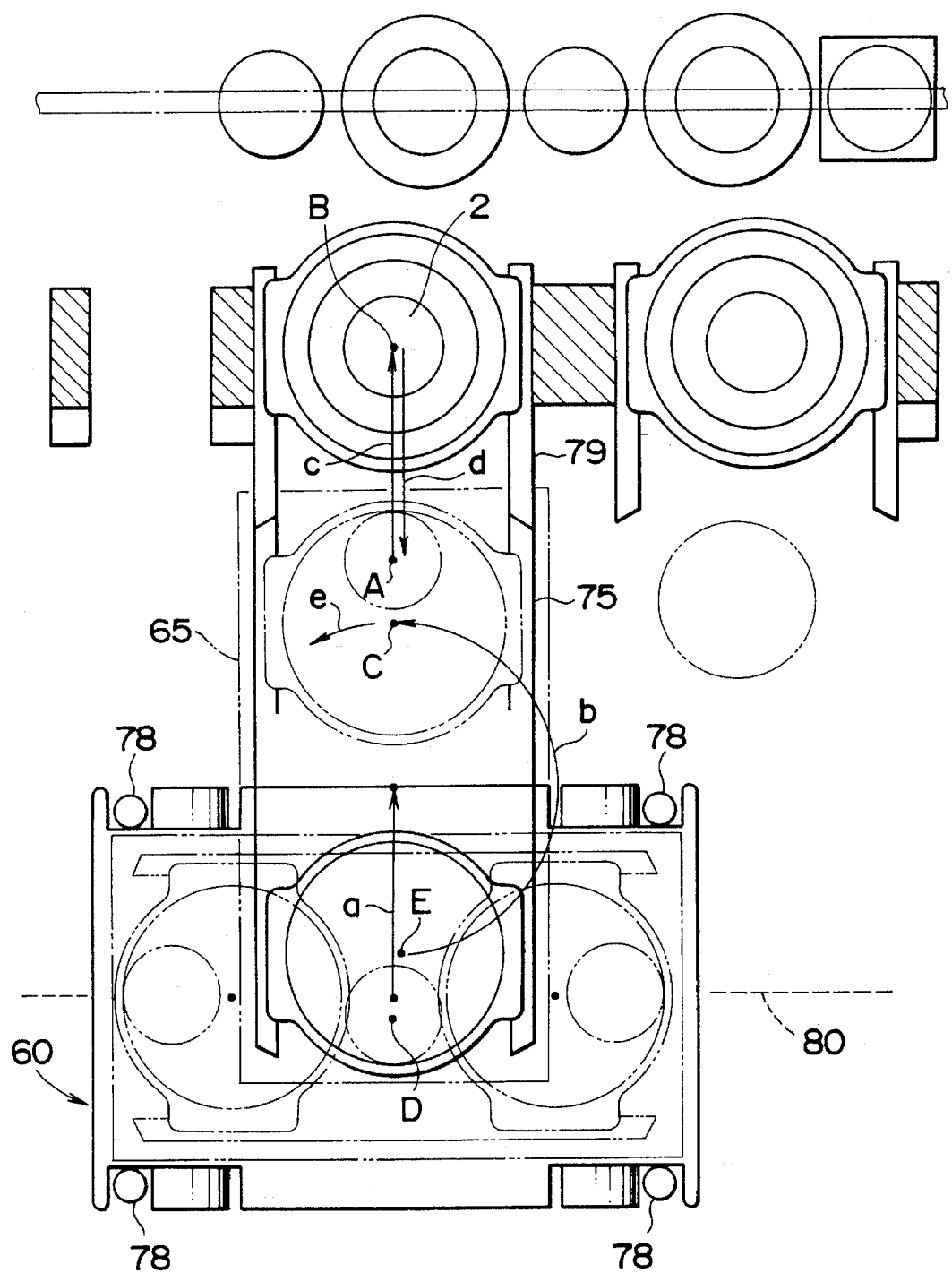
FIG. 7 is a top view showing operation of the mold change car.
Figure 8:
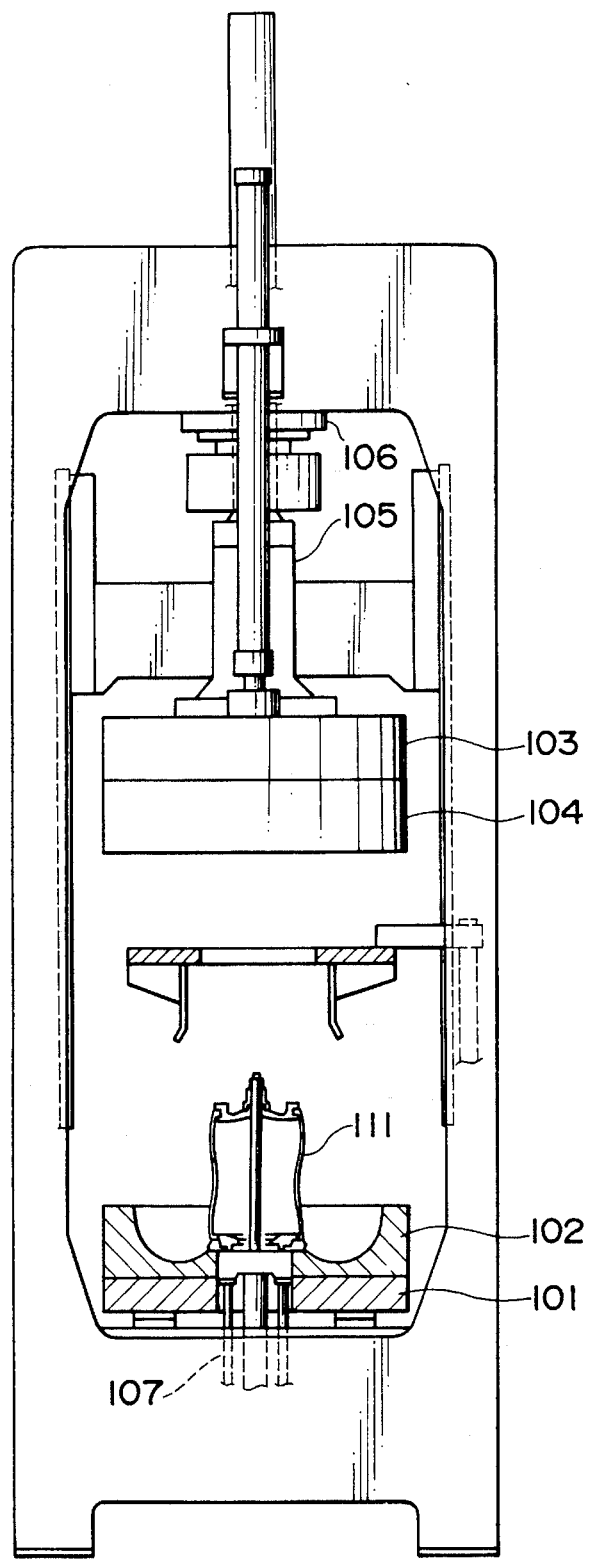
FIG. 8 is a general view of a tire vulcanizing press.
Figure 9:
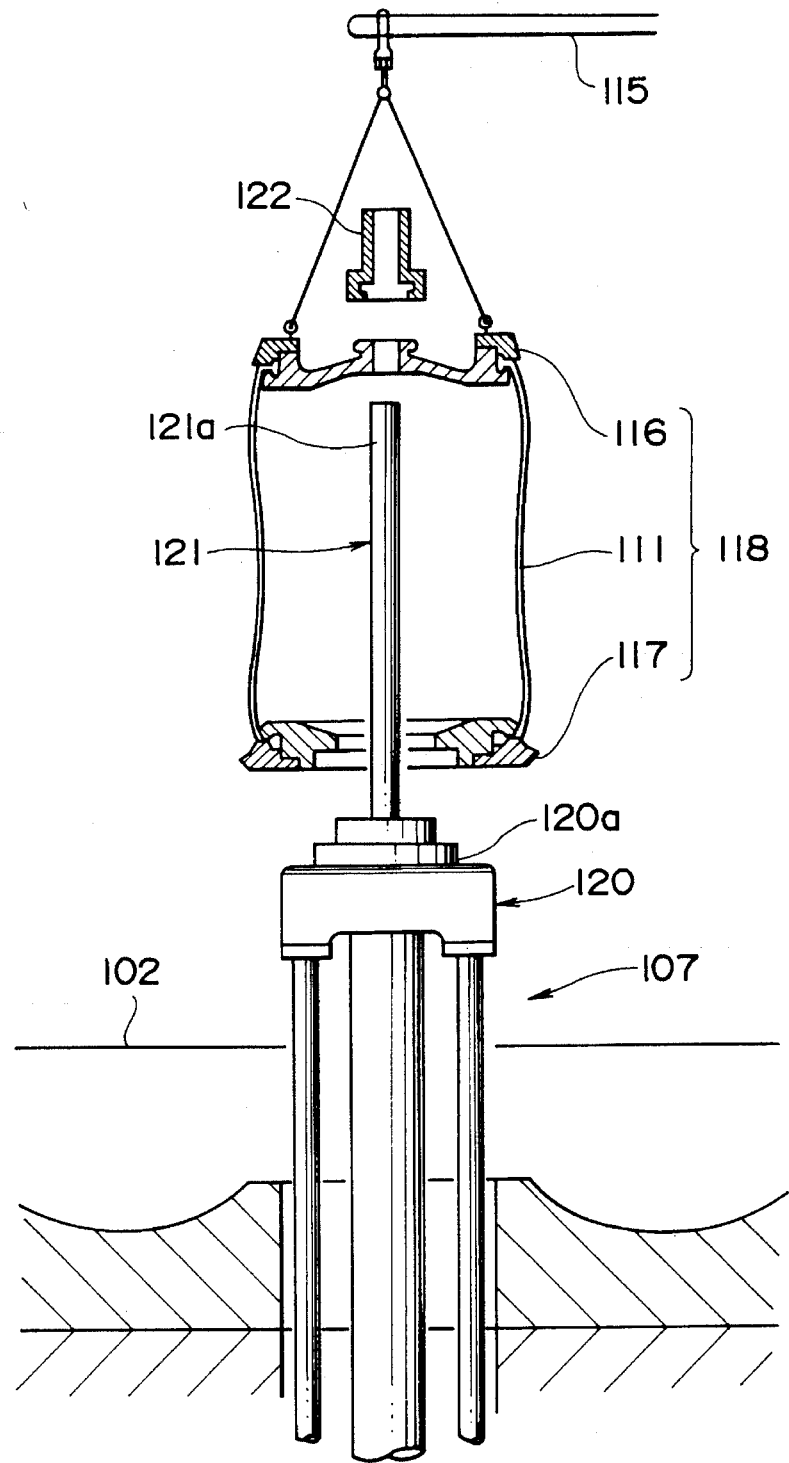
FIG. 9 is a view showing a conventional carrying apparatus.

In FIG. 7, the mold change car 60 can travel along a dot line 80, stopping in front of the tire vulcanizing press which requires tire replacement, and being stabilized to take a specific horizontal posture in a specific position by a positioning stabilizer 78. Then, a slide table not shown slides in the direction a and the turn table 65 turns in the direction b. In this state, the inner rail 75 of the turn table 65 is connected to an extension rail 79 of the tire vulcanizing press: Furthermore, when the stand frame not shown travels in the direction c, the clamps 51 and 52 of FIG. 6B is positioned right above the center mechanism 2. Then the arm 53 goes downwardly in the direction ② to clamp the old bladder 11 with the clamps 51 and 52. At this time, the chuck of the top ring is open, and the locking device of the bottom ring is in the released state. Therefore, as the arm 63 goes upwardly in the direction ②, the old bladder 11 is removed from the center mechanism. Thus the stand frame not illustrated travels in the direction d of FIG. 7, returning to the home position A. At the same time, an old mold assembly on the tire vulcanizing press is pushed out from the B position to the C position. Subsequently, with the 180-degree turn of the turn table 65, the new bladder in the D position comes to the A position, and the new mold assembly in the B position is moved to the C position, thereby setting the new mold assembly and attaching the new bladder to the center mechanism.

It is a matter of course that the bladder is replaced together with the mold assembly, but the bladder alone can be replaced by the use of the mold change car 60. According to the present invention, the bladder that has been manually carried and set can be automatically carried and set as described above.

The carrying apparatus of the present invention performs automatically carrying the bladder until the bladder fits in a specific part of the center mechanism while maintaining a vertical setting attitude. The bladder, therefore, requires no troublesome positioning operation relative to the center mechanism, and besides can be carried in a shorter period of time. Furthermore, the carrying apparatus can be set on the mold change car.

According to the present invention, the top ring that has been manually set can be automatically set to the top end of the center post by using the chuck, and therefore it becomes possible to automatically set the bladder by using both the conventional bottom ring and hub locking device together. Consequently, using a combination of this setting apparatus and the above-described carrying apparatus, a series of bladder carrying and setting operations can be performed automatically.

What is claimed is:

1. A bladder setting apparatus in a tire vulcanizing press having a center mechanism including a vertically movable center post, for setting a bladder held at a top thereof by a top ring and held at a bottom thereof by a bottom ring, said bladder setting apparatus comprising:

a chuck mounted adjacent a top end of said center post for gripping the top ring of the bladder to set the bladder;

a rod extending through said center post and cooperable with said chuck such that vertical movement of said rod operates said chuck to grip the top ring of the bladder; and a driving device provided adjacent a bottom end of said rod for vertically driving said rod so as to selectively grip the top ring of the bladder.

2. The bladder setting apparatus of claim 1 including conical engaging portions on said top ring and the top end of said center post for positioning the top ring relative to said center post.

3. The bladder setting apparatus of claim 2 including a nose mounted to said top ring so as to be housed in the top end of said center post when the top ring is centered by said conical engaging portions, wherein said chuck comprises chuck pawls in the top end of said center post and movable by said rod to selectively grip said nose.

4. The bladder setting apparatus of claim 3 including a projection in said center post, the projection being positioned relative to said pawls such that said projection engages said pawls to cause said pawls to grip said nose upon downward movement of said pawls by said rod.

5. The bladder setting apparatus of claim 1 wherein said driving device comprises a spring engaging the bottom end of said rod for downwardly biasing said rod and hydraulic cylinder having a rod engagable with the bottom of said rod for upwardly moving the rod in opposition to the biasing force of said spring.

6. The bladder setting apparatus of claim 1, further comprising a releasable locking device located at an outer periphery of said center post for locking the bottom ring of said bladder.

\* \* \* \* \*